(12) United States Patent
Thubert et al.

(10) Patent No.: US 10,142,227 B2
(45) Date of Patent: Nov. 27, 2018

(54) BIT INDEXED EXPLICIT REPLICATION FOR DETERMINISTIC NETWORK DATA PLANE

(71) Applicant: Cisco Technology, Inc., San Jose, CA (US)

(72) Inventors: Pascal Thubert, La Colle sur Loup (FR); Jean-Philippe Vasseur, Saint Martin d'Uriage (FR); Patrick Wetterwald, Mouans Sartoux (FR); Ijsbrand Wijnands, Leuven (BE)

(73) Assignee: CISCO TECHNOLOGY, INC., San Jose, CA (US)

( * ) Notice: Subject to any disclaimer, the term of this patent is extended or adjusted under 35 U.S.C. 154(b) by 111 days.

(21) Appl. No.: 15/271,811

(22) Filed: Sep. 21, 2016

(65) Prior Publication Data

US 2017/0222920 A1 Aug. 3, 2017

Related U.S. Application Data

(60) Provisional application No. 62/287,945, filed on Jan. 28, 2016.

(51) Int. Cl.
| | |
|---|---|
| *H04L 12/721* | (2013.01) |
| *H04L 29/06* | (2006.01) |
| *H04L 29/08* | (2006.01) |
| *H04L 12/761* | (2013.01) |

(Continued)

(52) U.S. Cl.
CPC ............. *H04L 45/70* (2013.01); *H04L 45/16* (2013.01); *H04L 67/1095* (2013.01); *H04L 69/22* (2013.01); *G06F 17/30324* (2013.01); *H04L 45/48* (2013.01); *H04L 67/12* (2013.01)

(58) Field of Classification Search
CPC ............................. H04L 1/242; H04L 45/70
See application file for complete search history.

(56) References Cited

U.S. PATENT DOCUMENTS

| | | |
|---|---|---|
| 9,088,502 B2 | 7/2015 | Thubert et al. |
| 9,226,292 B2 | 12/2015 | Thubert et al. |

(Continued)

OTHER PUBLICATIONS

European Search Report and Written Opinion, Application No. 17152468.9, dated Jul. 6, 2017, 12 pages.

(Continued)

*Primary Examiner* — Shukri Taha
(74) *Attorney, Agent, or Firm* — Leon R. Turkevich

(57) ABSTRACT

In one embodiment, a method comprises receiving, by a network device in a deterministic data network comprising deterministic segments, a data packet comprising a packet header having a bit index, each bit in the bit index associated with a corresponding one of the deterministic segments; the network device identifying, from the bit index, a first bit for a corresponding first deterministic segment and a second bit for a corresponding second deterministic segment, wherein the network device is an endpoint for transmitting deterministic traffic into each of the first and second deterministic segments; the network device selectively executing a replication operation of the data packet for transmission of a replicated data packet into each of the first and second deterministic segments, based on the network device detecting the corresponding first and second bits set for replication.

20 Claims, 8 Drawing Sheets

(51) Int. Cl.
*H04L 12/753* (2013.01)
*G06F 17/30* (2006.01)

(56) References Cited

U.S. PATENT DOCUMENTS

| | | | | |
|---|---|---|---|---|
| 2015/0138961 A1* | 5/2015 | Wijnands | ............ | H04L 41/0668 370/228 |
| 2016/0119159 A1* | 4/2016 | Zhao | ................... | H04L 12/1854 370/390 |
| 2016/0134535 A1* | 5/2016 | Callon | ................... | H04L 45/48 370/390 |

OTHER PUBLICATIONS

Eckert et al., "Traffic Engineering for Bit Index Explicit Replication BIER-TE", Network Working Group, Internet-Draft, [online], Oct. 18, 2015, [retrieved on Apr. 26, 2016]. Retrieved from the Internet: URL: <https://tools.ietf.org/pdf/draft-eckert-bier-te-arch-02.pdf>, pp. 1-30.

Wijands, Ed. et al., "Multicast using Bit Index Explicit Replication", Internet Engineering Task Force (IETF), Internet-Draft, [online], Jan. 19, 2016, [retrieved on Sep. 20, 2016]. Retrieved from the Internet: URL: <https://tools.ietf.org/pdf/draft-ietf-bier-architecture-03.pdf>, pp. 1-36.

Filsfils, Ed et al., "Segment Routing Architecture", Network Working Group, Internet-Draft, [online], Dec. 15, 2015, [retrieved on Sep. 20, 2016]. Retrieved from the Internet: URL: <https://tools.ietf.org/pdf/draft-ietf-spring-segment-routing-07.pdf>, pp. 1-24.

Thubert, Ed., "6TiSCH requirements for DetNet", 6TiSCH, Internet-Draft, [online], Jun. 11, 2015, [retrieved on Sep. 20, 2016]. Retrieved from the Internet: URL: <https://tools.ietf.org/pdf/draft-thubert-6tisch-4detnet-01.pdf>, pp. 1-21.

Watteyne, Ed. et al., "Using IEEE 80215.4e Time-Slotted Channel Hopping (TSCH) in the Internet of Things (IoT): Problem Statement", Internet Engineering Task Force (IETF), Request for Comments; 7554, pp. 1-23.

Thubert, et al., "IETF 6TSCH: Combining IPv6 Connectivity with Industrial Performance", 2013 Seventh International Conference on Innovative Mobile and Internet Services in Ubiquitous Computing, IEEE, Jul. 3, 2013, XP032485811, pp. 541-546.

\* cited by examiner

| ADJACENCY | BIER BitString | |
|---|---|---|
| | | 12345678 ← 20 |
| (PCE -> I) | B0: | 11011110 |
| I -> A | B1: | 01011110 |
| A -> B | B2: | 00011110 |
| B -> D | B3: | 00010110 |
| D -> C | B4: | 00010010 |
| A -> C | B5: | 01001110 |

| OPERATION | BIER BitString | |
|---|---|---|
| | | 12345678 ← 20 |
| 26f → D -> C | B4: | 00010010 |
| 26d → A -> C | B5: | 01001110 |
| 70 → AND IN C | | 00000010 ← 72 |
| 26g → C -> E | B6: | 00000000 |

| ADJACENCY | BIER BitString |     |
|---|---|---|
| | | 123456789••• |
| O -> D2 | B7: | 111111111••• |
| D2 -> G | B8: | 011111111 |
| G -> H | B9: | 011101111 |
| H -> I | B10: | 011101011 |
| I -> Z | B11: | 011101010 |
| | | |
| D2 -> C2 | B12: | 101111111 |
| C2 -> M | B13: | 100111111 |
| M -> F | B14: | 100011111 |
| H -> F | B15: | 011101101 |
| F -> Z | B16: | 000000101 |

FIG. 5C

| OPERATION | BIER BitString |     |
|---|---|---|
| | | 123456789 |
| M -> F | B14: | 100011111 |
| H -> F | B15: | 011101101 |
| AND IN F | | 000001101 |
| I -> Z | B11: | 011101010 |
| F -> Z | B16: | 000000101 |
| AND IN Z | | 000000000 |

BIT INDEXED EXPLICIT REPLICATION FOR DETERMINISTIC NETWORK DATA PLANE

This application claims priority to Provisional Application No. 62/287,945, filed Jan. 28, 2016.

TECHNICAL FIELD

The present disclosure generally relates to executing bit indexed explicit replication for a deterministic network data plane.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

The Deterministic Networking (DetNet) Working Group (WG) of the Internet Engineering Task Force (IETF) describes a data forwarding protocol ("data plane") that must signal a flow and a sequence number within that flow to enable replication and elimination. In order to debug a network, an essential requirement is that it can always be possible to identify which node (i.e., network device) generates a certain copy of a data packet and to identify which copy that was generated; for example, in the case of a replicating node in the middle of a path, an identification is needed whether a generated copy was for transmission in the left direction or for transmission in the right direction.

BRIEF DESCRIPTION OF THE DRAWINGS

Reference is made to the attached drawings, wherein elements having the same reference numeral designations represent like elements throughout and wherein:

FIGS. 5A-5D illustrates example bit indexes generated by the PCE of FIGS. 1A and 1B, and updated by the network devices of FIGS. 1A and 1B as a data packet traverses throughout the deterministic data network, according to an example embodiment.

DESCRIPTION OF EXAMPLE EMBODIMENTS

Overview

Figure 1A:
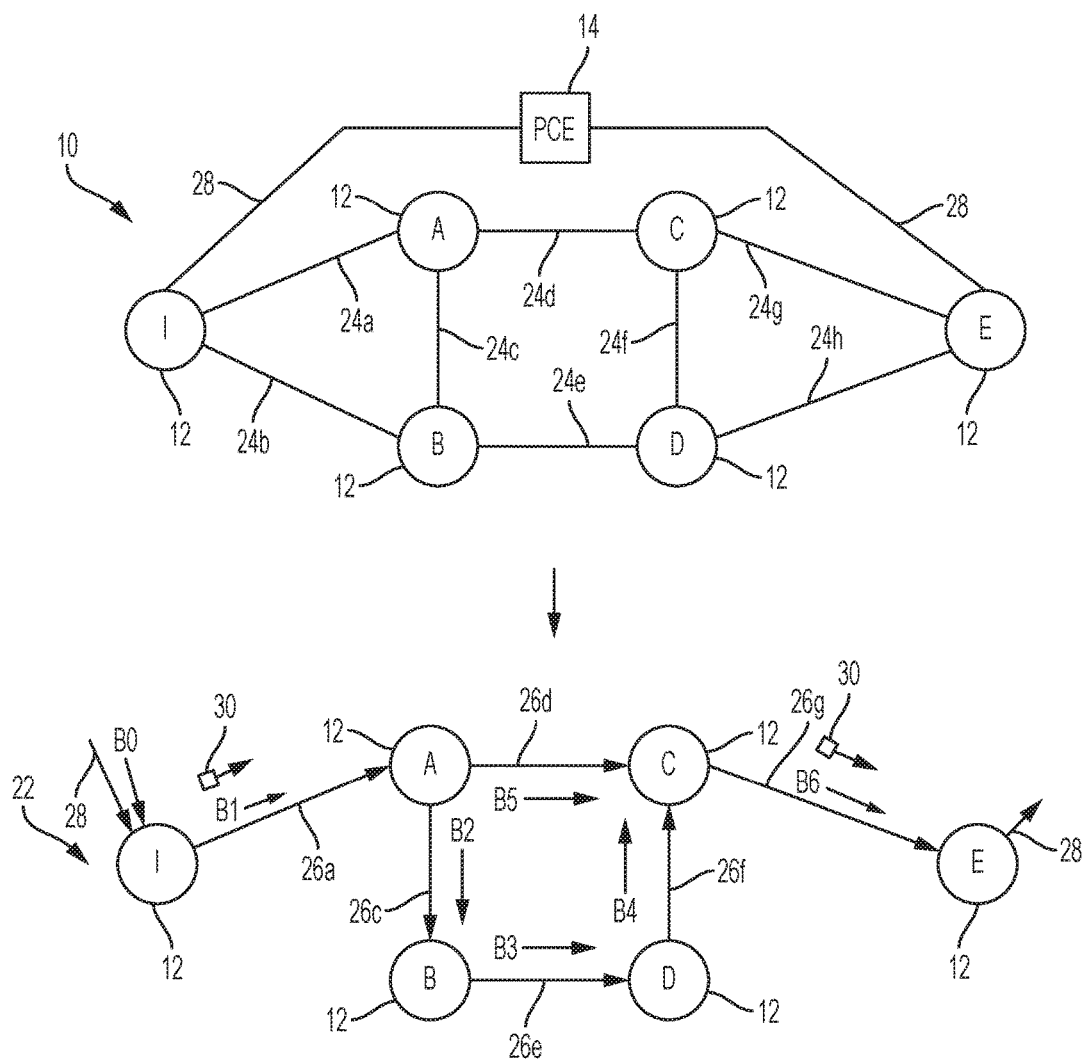
FIGS. 1A and 1B are diagrams illustrating an example deterministic data network having network devices and a path computation element (PCE) for deterministic forwarding of a data packet based on a Bit Indexed Explicit Replication (BIER) structure in the data packet, according to an example embodiment.

In one embodiment, a method comprises receiving, by a network device in a deterministic data network comprising deterministic segments, a data packet comprising a packet header having a bit index, each bit in the bit index associated with a corresponding one of the deterministic segments; the network device identifying, from the bit index, a first bit for a corresponding first deterministic segment and a second bit for a corresponding second deterministic segment, wherein the network device is an endpoint for transmitting deterministic traffic into each of the first and second deterministic segments; the network device selectively executing a replication operation of the data packet for transmission of a replicated data packet into each of the first and second deterministic segments, based on the network device detecting the corresponding first and second bits set for replication.

In another embodiment, an apparatus comprises a device interface circuit and a processor circuit. The device interface circuit is configured for receiving a data packet comprising a packet header having a bit index, the apparatus implemented as a network device in a deterministic data network comprising deterministic segments, each bit in the bit index associated with a corresponding one of the deterministic segments. The processor circuit is configured for identifying, from the bit index, a first bit for a corresponding first deterministic segment and a second bit for a corresponding second deterministic segment, wherein the network device is an endpoint for transmitting deterministic traffic into each of the first and second deterministic segments. The processor circuit further is configured for selectively executing a replication operation of the data packet for transmission of a replicated data packet into each of the first and second deterministic segments, based on the network device detecting the corresponding first and second bits set for replication.

In another embodiment, one or more non-transitory tangible media encoded with logic for execution by a machine and when executed by the machine operable for: receiving, by the machine implemented as a network device in a deterministic data network comprising deterministic segments, a data packet comprising a packet header having a bit index, each bit in the bit index associated with a corresponding one of the deterministic segments; the network device identifying, from the bit index, a first bit for a corresponding first deterministic segment and a second bit for a corresponding second deterministic segment, wherein the network device is an endpoint for transmitting deterministic traffic into each of the first and second deterministic segments; the network device selectively executing a replication operation of the data packet for transmission of a replicated data packet into each of the first and second deterministic segments, based on the network device detecting the corresponding first and second bits set for replication.

In another embodiment, a method comprises generating, by a path computation element in a deterministic data network, a plurality of deterministic segments for routing data traffic to a destination network device; generating a bit index for insertion in each data packet transmitted in the deterministic data network, each bit in the bit index associated with a corresponding one of the deterministic segments, each bit if set causing a corresponding endpoint of the deterministic segment to execute replication of the data packet for transmission of the replicated data packet into the corresponding deterministic segment, each bit index generated by the path computation element identifying the deterministic segments to be used to transmit a data packet from a source network device to a destination network device; and sending, to the source network device, the corresponding bit index for insertion into a data packet for transmission of the data packet from the source network device to the destination network device.

In another embodiment, one or more non-transitory tangible media encoded with logic for execution by a machine and when executed by the machine operable for: generating, by the machine implemented as a path computation element in a deterministic data network, a plurality of deterministic segments for routing data traffic to a destination network device; generating a bit index for insertion in each data packet transmitted in the deterministic data network, each bit in the bit index associated with a corresponding one of the deterministic segments, each bit if set causing a corresponding endpoint of the deterministic segment to execute replication of the data packet for transmission of the replicated data packet into the corresponding deterministic segment, each bit index generated by the path computation element identifying the deterministic segments to be used to transmit a data packet from a source network device to a destination network device; and sending, to the source network device, the corresponding bit index for insertion into a data packet for transmission of the data packet from the source network device to the destination network device.

Detailed Description

Particular embodiments enable use of a bit index within a packet header of a deterministic data packet that controls replication operations in a deterministic network, and that identifies replication progress as a replicated data packet progresses (i.e., traverses) throughout the deterministic network. The bit index can be expressed as a single bit vector of "n" bits, where each bit corresponds to an identifiable pair of endpoint devices of a deterministic segment within the deterministic network: the identifiable pair can be network devices establishing an Ethernet link; the identifiable pair also can be endpoint devices in a deterministic network utilizing segment routing. Hence, each deterministic segment, also referred to herein as an "adjacency", is bounded on each of its two ends by a corresponding endpoint device and can be represented by a corresponding bit and can be implemented as any one of a link layer (e.g., Ethernet) hop, a Label Switched Path, an IPv6 loose or strict source routed path, an IPv6 segment, etc. The bit index can be deployed as a bit indexed explicit replication (BIER) structure.

An example of Bit Indexed Explicit Replication (BIER) is described, for example, in the IETF Draft Wijnands, Ed., et al., "Multicast using Bit Index Explicit Replication" (draft-ietf-bier-architecture-03). The IETF Draft by Eckert et al., "Traffic Engineering [sic] for Bit Index Explicit Replication BIER-TE" (draft-eckert-bier-te-arch-02), describes use of BIER for traffic engineering that uses a bit string in a packet header. An example of Segment Routing is described in the IETF Draft Filsfils, Ed., et al., "Segment Routing Architecture" (draft-ietf-spring-segment-routing-07).

As described in further detail below, a controller (e.g., a path computation element or "PCE") can compute a deterministic path (e.g., a track) having multiple paths for enabling reachability of a data packet to a destination: the controller can implement the deterministic path based on setting, within the data packet, selected bits in the bit index for selective replication of the data packet along the deterministic path. Each network device in the deterministic network also is configured for responding to a selected set bit in the bit index, enabling the corresponding network device, in response to receiving a data packet specifying the bit index, to selectively replicate, forward, and/or eliminate the data packet on a corresponding deterministic segment.

Figure 1B:
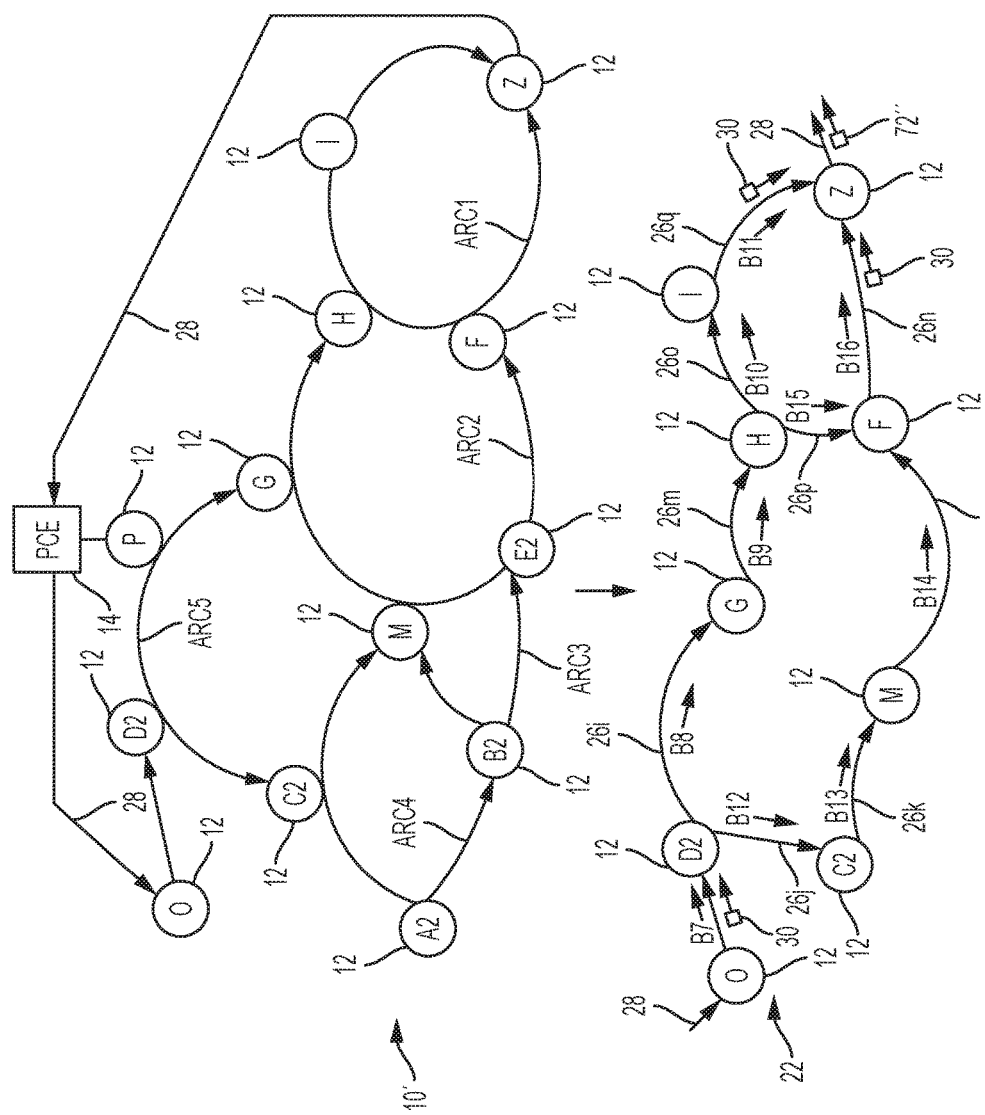

FIGS. 1A and 1B are diagrams illustrating example deterministic data network 10 and 10' having network devices 12 and a path computation element (PCE) 14 for deterministic forwarding of a data packet 30 based on a bit index, also referred to as a "BIER structure" (18 of FIG. 2) in the data packet 30, according to an example embodiment. Each apparatus 12, 14 is a physical machine (i.e., a hardware device) configured for implementing network communications with other physical machines via the network 10 or 10'. The term "configured for" or "configured to" as used herein with respect to a specified operation refers to a device and/or machine that is physically constructed and arranged to perform the specified operation.

The bits 20 of the BIER structure 18 (previously reserved for Bit Indexed Explicit Replication—Traffic Engineering (BIER-TE)) can instead be used to control at a source ingress node (e.g., "I" of FIG. 1A, "O" of FIG. 1B) which of the possible replication points will effectively execute the replication of the data packet (setting bits associated to L2 links/L3 segments); the bits 20 in the BIER structure 18, in addition to controlling execution of replication by "replicators", also can mark along the way which replicators effectively performed a replication as the data packet 30 traverses through the deterministic network 10.

Hence, in one embodiment, the bits 20 in the BIER structure 18 can be used for Segment Routing segments at Layer 3 (L3) whereas the BIER-TE uses the bits for outgoing links only.

In addition to generating a plurality of deterministic segments 24 for routing data traffic to a destination network device, the processor circuit of the PCE 14 can generate a bit index 18 for insertion in each data packet 30 transmitted in the deterministic data network. The PCE can control the replication by forcing the source network device of the flow to send a BIER bitmap with the bit that corresponds to replications that must happen. According to an example embodiment, since a same bit is used for both directions along the steps of the ladder, both endpoints of a segment will try to transmit to the other when the bit is set. A replication point will only send a packet along a programmed segment if the bit for that segment is set in the packet, and it will reset (i.e., clear) that bit to zero at the time of sending.

FIG. 1A illustrates a deterministic data network 10 having network devices 12 and a PCE 14 configured for constructing in the deterministic data network 10 a deterministic path 22 comprising deterministic segments 24 (e.g., 24a, 24b, 24c, 24d, 24e, 24f, 24g, and 24h). The PCE 14 can implement the deterministic path 22 in the form of a "ladder" structure topology comprising step adjacencies (e.g., 24c, 240 and side-rail adjacencies (e.g., 24d, 24e), enabling a data packet 30 transmitted by an ingress network device ("I") to reach reaching a destination network device (e.g., egress "E") 12. The PCE 14 can implement the deterministic path 22 based on setting, within the data packet 30, selected bits in a bit index 18 for selective replication of the data packet 30 along selected deterministic segments 26 of the deterministic path 22. The deterministic path 22 also is referred to as a traversal path 22.

Figure 2:
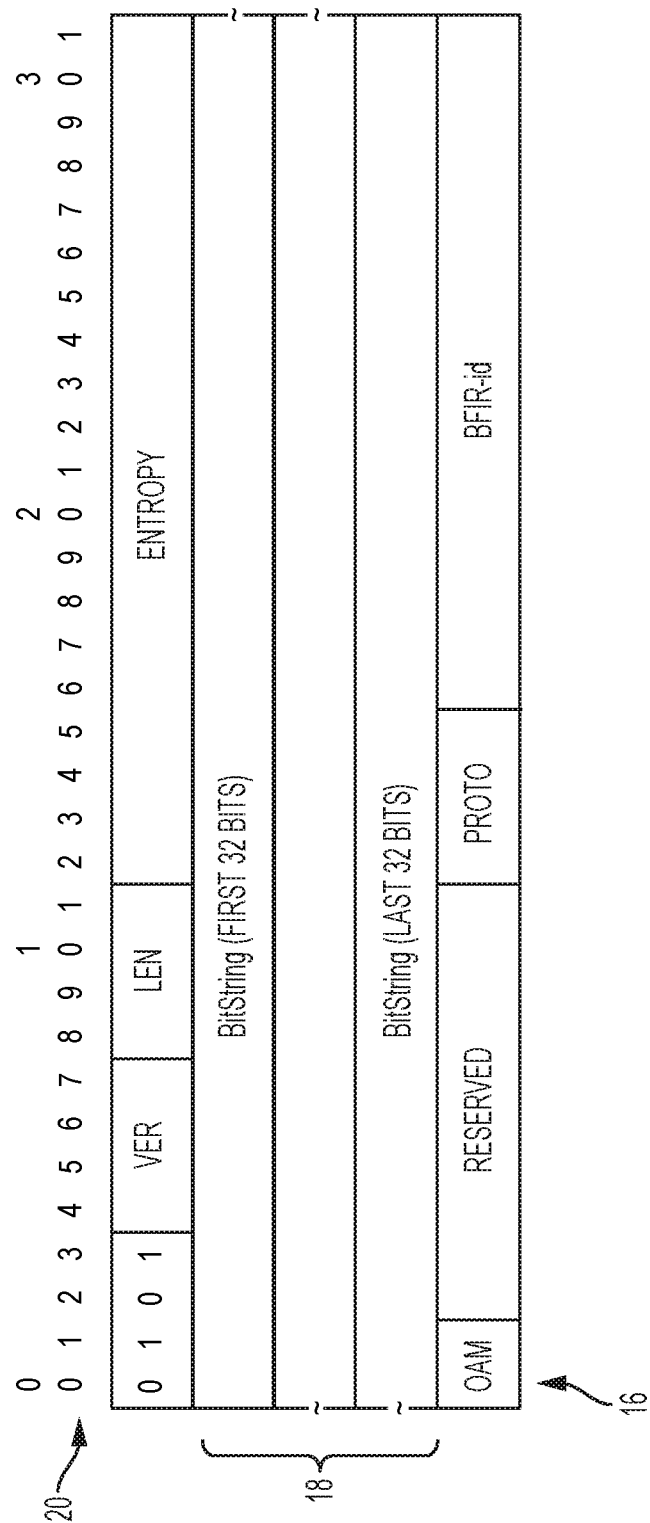
FIG. 2 illustrates an example data packet header comprising a BIER structure, according to an example embodiment.

FIG. 2 illustrates an example data packet header 16 within a data packet 30 and comprising a BIER structure 18, according to an example embodiment. The BIER header 16 is of variable size, the bit index 18 can include 64 bits if 64 segments are sufficient, although the bit index 18 can include 128 or 256 bits (or more) if 128 or 256 segments are needed for more complex paths.

Figure 3:
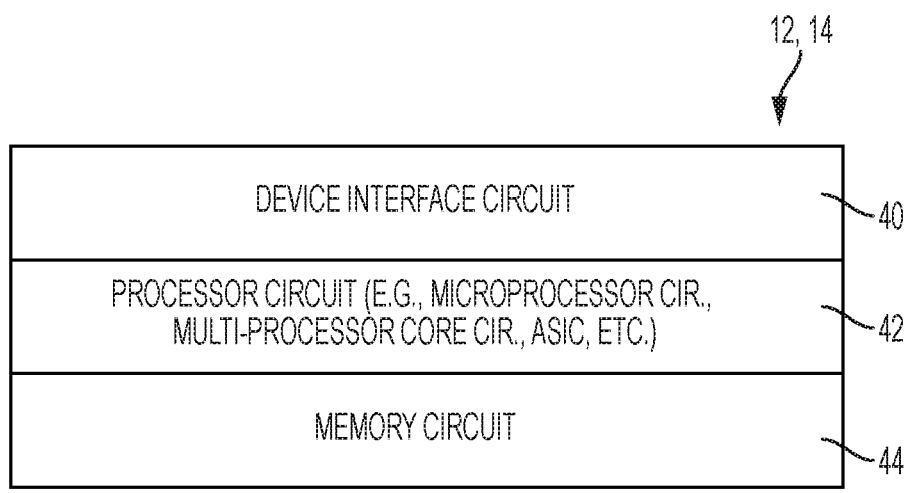
FIG. 3 illustrates an example implementation of any one of the devices of FIG. 1, according to an example embodiment.

FIG. 3 illustrates an example implementation of any one of the devices 12 and/or 14 of FIG. 1, according to an example embodiment. As illustrated in FIG. 3, each apparatus 12 and/or 14 can include a device interface circuit 40, a processor circuit 42, and a memory circuit 44. The device interface circuit 40 can include one or more distinct physical layer transceivers for communication with any one of the other devices 12 and/or 14; the device interface circuit 40 also can include an IEEE based Ethernet transceiver for communications with the devices of FIG. 1 via any of the links (e.g., a wired or wireless link, an optical link, etc.). The processor circuit 42 can be configured for executing any of the operations described herein, and the memory circuit 44 can be configured for storing any data or data packets as described herein.

Any of the disclosed circuits of the devices 12 and/or 14 (including the device interface circuit 40, the processor circuit 42, the memory circuit 44, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 44) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 44 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 44 can be implemented dynamically by the processor circuit 42, for example based on memory address assignment and partitioning executed by the processor circuit 42.

Figure 4A:
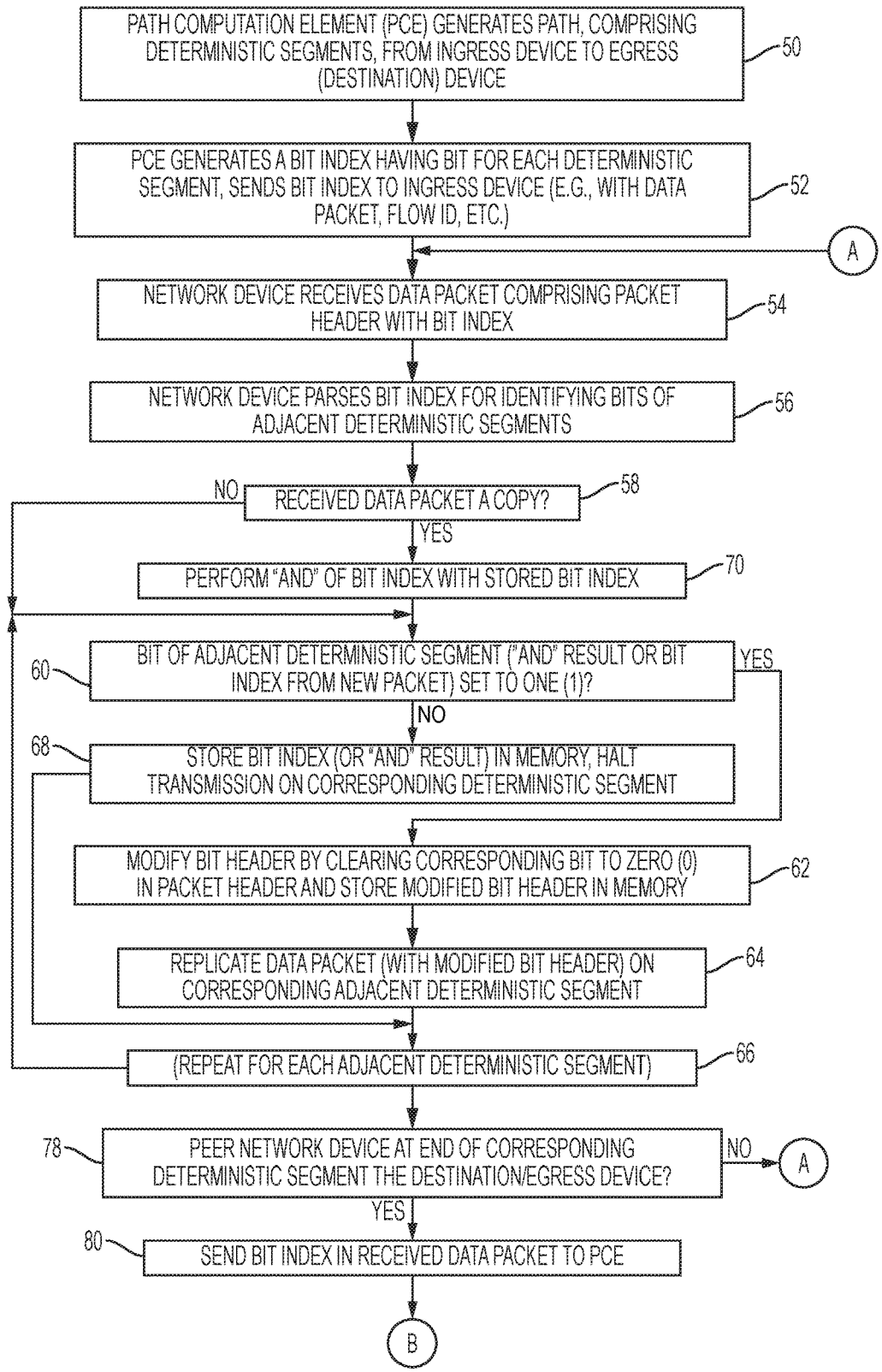
FIGS. 4A and 4B illustrate an example method by the PCE and network devices of generating and updating a BIER structure as a data packet traverses throughout the deterministic data network, according to an example embodiment.
Figure 4B:
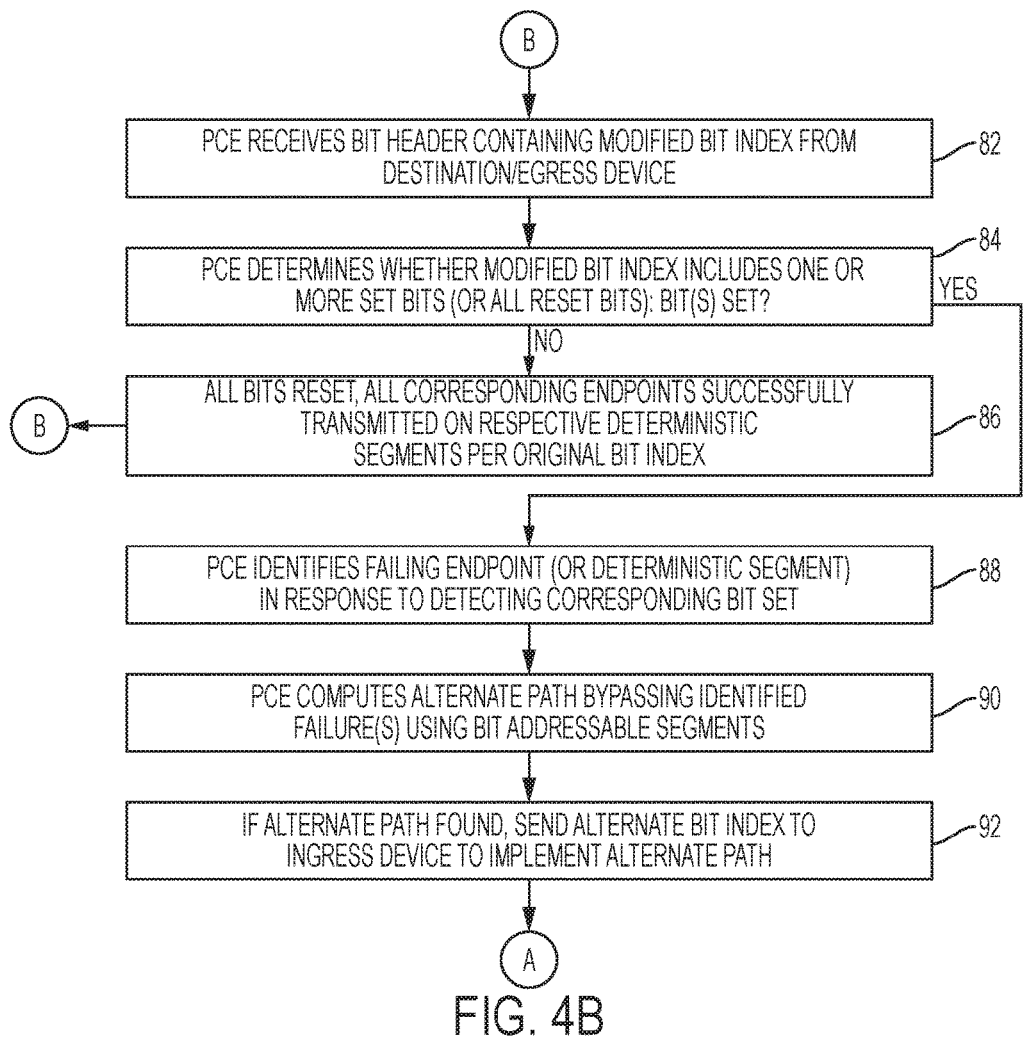

FIGS. 4A and 4B illustrate an example method by the PCE and network devices of generating and updating a BIER structure 18 as a data packet 30 traverses throughout the deterministic data network 10 or 10', according to an example embodiment. The operations described with respect to any of the Figures can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or at least some of the operations in parallel.

Referring to FIG. 1A and FIG. 4A, the processor circuit 42 of the PCE 14 in operation 50 is configured for generating a deterministic path 22 comprising selected deterministic segments 26 for deterministic transmission of a data packet 30 from an ingress network device "I" 12 to an egress network device "E" 12. The processor circuit 42 of the PCE 14 in operation 52 is configured for generating a bit index 18 based on setting selected bits 20 of a bit index 18 having a bit for each deterministic segment 24, where a set bit (set to 1) identifies a selected deterministic segment 26, and a reset bit (equal to 0) identifies a segment that is not to be used. The PCE 14 also can program each of the network devices 12 (via a wired or wireless data link 28) to identify the bits 20 associated with the respective deterministic segments 24. Hence, each network device 12 can identify an adjacent deterministic segment 24 by its corresponding bit position 20 in the bit index 18. Hence, each set bit in the bit index 18 can cause a segment endpoint to replicate a data packet 30 into an adjacent selected deterministic segment 26.

For example, FIG. 5A illustrates an example bit index "B0" 18 generated by the PCE 14 in operation 52 and supplied to the ingress network device "I" 12 via a data link 28. The bit index "B0" can be supplied with the data packet 30 (e.g., within the data packet header 16 of the data packet 30), or alternately as a control message specifying an identifier for the data packet 30 (e.g., a flow identifier for a data stream, etc.).

As illustrated in FIG. 5A, assume in operation 52 that the PCE 14 generates an initial bit index "B0" 18 of "11011110" for the deterministic data network 10 of FIG. 1A, where bit 1 is allocated for the deterministic segment 24*a*, bit 2 is allocated for the deterministic segment 24*c*, bit 3 is allocated for the deterministic segment 24*b*, bit 4 is allocated for the deterministic segment 24*d*, bit 5 is allocated for the deterministic segment 24*e*, bit 6 is allocated for the deterministic segment 24*f*, bit 7 is allocated for the deterministic segment 24*g*, and bit 8 is allocated for the deterministic segment 24*h*. Hence, the initial bit index "B0" 18 identifies that deterministic segments 24*b* and 24*h* are not to be used, whereas the deterministic segments 24*a*, 24*c*, 24*d*, 24*e*, 24*f*, and 24*g* are selected deterministic segments 26 identified in the initial bit index "B0" 16 as respective selected deterministic segments 26*a*, 26*c*, 26*d*, 26*e*, 26*f*, and 26*g*.

In response to the device interface circuit 40 of the ingress network device "I" 12 receiving in operation 54 at least the bit index "B0" 18 (e.g., within a data packet 30 comprising the data packet header 16 containing the bit index "B0" 18), the processor circuit 42 of the ingress network device "I" 12 in operation 56 can parse the bit index "B0" 18 to determine whether it is instructed to replicate the data packet 30 on any of its adjacent deterministic segments 24*a* or 24*b*.

The processor circuit 42 of the ingress network device "I" 12 in operation 58 can determine it is not to receive any further copies (described below), and can determine in operation 60 whether the bit position 20 for an adjacent deterministic segment 24*a* or 24*b* is set to one or zero; as described previously, the PCE 14 (or another control device) can program the ingress network device "I" 12 to identify that the bit position "1" corresponds to the deterministic segment 24*a* and the bit position "3" corresponds to the deterministic segment 24*b*.

The processor circuit 42 of the ingress network device "I" 12 in operation 60 can determine that the corresponding bit at position "1" (allocated for its adjacent deterministic segment deterministic segment 24*a*) is set to "1", and in response the processor circuit 42 of the ingress network device "I" 12 in operation 62 can modify the bit index "B0" 18 by clearing the corresponding bit of the bit index "B0" 18 at position "1" to zero, resulting in the modified bit index "B1" 18 having the bit at position "1" reset to zero. The processor circuit 42 of the ingress network device "I" 12 in operation 62 also can store the modified bit index "B1" 18 associated with the selected deterministic segment 26*a* as a data structure in its memory circuit 44 indicating that the data packet 30 is output on the selected deterministic segment 26*a* with the bit index "B1" 18, described in further detail below. Following generating the modified bit index "B1" 18, the processor circuit 42 of the ingress network device "I" 12 in operation 64 can initiate replication of the data packet 30 (containing the bit index "B1" 18) on the adjacent selected deterministic segment 26*a*, for example based on sending the data packet 30 to the device interface circuit 40 for transmission according to a prescribed transmission schedule (e.g., at an allocated timeslot and/or channel frequency using, for example, TSCH or 6TiSCH).

The processor circuit 42 of the ingress network device "I" 12 in operation 66 can repeat the above-described operations for its next adjacent deterministic segment 24*b*. Hence, the processor circuit 42 of the ingress network device "I" 12 in operation 60 can determine that the bit position 20 of the bit index "B0" 18 at bit position "3" for the deterministic segment 24*b* is reset to zero, and in response halt transmission on the deterministic segment 24*b* and store in operation 68 the bit index "B0" 18 for the adjacent deterministic segment 24*b*.

Hence, the network device "I" can store in its memory circuit 44: a data structure identifying transmission of the bit index "B1" on its adjacent deterministic segment 26*a*; and a data structure identifying transmission was halted on its adjacent deterministic segment 24*b* in response to the bit index "B0" 18; alternately, the processor circuit 42 can store in the memory circuit 44 a bitwise AND of the bit index "B0" 18 and the modified bit index "B1" to identify the replication status on all its adjacent deterministic segments 26*a* and 24*b*.

As illustrated in FIG. 1A, the device interface circuit 40 of the peer network device "A" 12 is configured for receiving the data packet 30 containing the bit index "B1" 18 via its adjacent deterministic segment 24*a*: since the peer network device "A" 12 is not the destination device (or egress device "E") in operation 78, the processor circuit 42 of the peer network device "A" 12, in response to receiving in operation 54 the data packet 30 comprising the bit index "B1" 18 can parse in operation 56 the bit index "B1". The processor circuit 42 of the peer network device "A" 12 can determine at operation 60 that the bit index "B1" 18 at bit position "1" is reset to zero, and in response store the bit index "B1" 18 in its memory circuit 44 (e.g., as a data structure indicating transmission on the deterministic segment 24*a* was halted due to the bit index "B1" 18) and halt transmission on the corresponding deterministic segment 24*a* in operation 68.

The processor circuit 42 of the network device "A" 12 also can determine at operation 60 (repeated in operation 66 for its next adjacent deterministic segment 24*c*) that the index "B1" 18 at bit position "2" is set to "1", and in response modify the bit index "B1" 18 in operation 62 by resetting the bit at bit position "2" to zero, resulting in the modified bit index "B2". The processor circuit 42 of the network device "A" 12 in operation 62 also can store the modified bit index "B2" 18 in its memory circuit 44 (e.g., in a data structure specifying that the modified bit index "B2" 18 is output on the selected deterministic segment 26*c*), and initiate replication of the data packet 30 (comprising the bit index "B2" 18) on the selected deterministic segment 26*c* according to its allocated schedule.

The processor circuit 42 of the network device "A" 12 also can repeat in operation 66 the parsing of the received bit index "B1" 18 for its next adjacent deterministic segment 24*d*, including determining in operation 60 that the bit index "B1" 18 at bit position "4" is set to "1", and in response generating the modified bit index "B5" 18 by resetting the bit of the index "B1" 18 at bit position "4" to zero. The modified bit index "B5" 18 can be stored in the memory circuit 44 of the network device "A" 12 (identified in a data structure as the modified bit index "B5" being output on the selected deterministic segment 26*d*), and the data packet 30 comprising the modified bit index "B5" 18 can be queued for transmission on the selected deterministic segment 26*d*.

Hence, the network device "A" stores in its memory circuit: a data structure identifying transmission on its adjacent deterministic segment 24*a* was halted due to the bit index "B1" 18; a data structure identifying transmission of the bit index "B2" on its adjacent deterministic segment 26*c*; and a data structure identifying transmission of the bit index "B5" on its adjacent deterministic segment 26*d*.

As apparent from the foregoing, the network devices "B" and "D" 12 can repeat the above-described operations in response to receiving the data packet 30 specifying the bit index "B2" and "B3", respectively. In particular, the network device "B" 12 in operation 68 halts any transmission of the data packet 30 on the deterministic segment 24*c* in response to detecting at operation 60 the bit index "B2" 18 at bit position "2" is reset to zero; the network device "B"

12 also generates in operation 62 the bit index "B3" 18 in response to detecting in operation 60 that the bit index "B2" 18 at bit position "5" is set to "1" indicating that its adjacent deterministic segment 24e is a selected deterministic segment 26e. Hence, the network device "B" 12 stores in its memory circuit 44 a data structure identifying scheduled transmission of the modified bit index "B3" 18 on the selected deterministic segment 26e (indicating bit index "B3" is to be transmitted on the selected deterministic segment 26e), and queues in operation 64 the data packet 30 (containing the bit index "B3" 18) for transmission on the selected deterministic segment 26e. The network device "B" 12 also in operation 68 halts transmission on the deterministic segment 24b in response to the corresponding bit "3" of the bit index "B2" being reset to zero, and stores in its memory circuit 44 a data structure identifying transmission on the deterministic segment 24b was halted in response to the bit index "B2" for the deterministic segment 24b (due to bit "3" of bit index "B2" being reset to zero).

Hence, the network device "B" stores in its memory circuit 44: a data structure identifying transmission on its adjacent deterministic segment 24b was halted in response to the bit index "B2" 18; a data structure identifying transmission on its adjacent deterministic segment 24c was halted in response to the bit index "B2" 18; and a data structure identifying transmission of the bit index "B3" on its adjacent deterministic segment 26e.

Similarly, the network device "D" 12 in operation 68 halts any transmission of the data packet 30 on the deterministic segment 24e in response to detecting at operation 60 the bit index "B3" 18 at bit position "5" is reset to zero, and stores in its memory circuit 44 the bit index "B3" for the deterministic segment 26e; the network device "D" 12 in operation 68 also halts any transmission of the data packet 30 on the deterministic segment 24h in response to detecting at operation 60 the bit index "B3" 18 at bit position "8" is reset to zero, and stores in its memory circuit 44 the bit index "B3" for the deterministic segment 24h; the network device "D" 12 also generates in operation 62 the bit index "B4" 18 in response to detecting in operation 60 that the bit index "B3" 18 at bit position "6" is set to "1". Hence, the network device "D" 12 stores the modified bit index "B4" 18 in its memory circuit 44 (indicating bit index "B4" is to be transmitted on the selected deterministic segment 260, and queues in operation 64 the data packet 30 (containing the bit index "B4" 18) for transmission on the selected deterministic segment 26f.

Hence, the network device "D" stores in its memory circuit 44: a data structure identifying transmission was halted on its adjacent deterministic segment 24e in response to the bit index "B3" 18; a data structure identifying transmission of the bit index "B4" on its adjacent deterministic segment 26f; and a data structure identifying transmission was halted on its deterministic segment 24h in response to the bit index "B3" 18.

The PCE 14 can configure the network device "C" 12 (e.g., send instructions) to identify that the network device "C" 12 can receive one or more copies of a data packet 30 from different deterministic segments, for example deterministic segments 24d and/or 24f. In this case, the device interface circuit 40 and/or the processor circuit 42 of the network device "C" 12 can be configured to wait for all intended copies of the data packet 30 (according to the deterministic schedule established by the PCE 14) before initiating any forwarding operations.

Hence, the processor circuit 42 of the network device "C" 12 in operation 58 can detect that it received two copies of the data packet 30 via the respective deterministic segments 26d and 26f. In response to receiving the two copies of the data packet 30 via the respective deterministic segments 26d and 24f, the processor circuit 42 of the network device "C" 12 in operation 70 of FIG. 4A and FIG. 5B can perform a bitwise AND operation on the bit index "B4" 18 (received from the selected deterministic segment 260 and the bit index "B5" 18 (received from the selected deterministic segment 26d), resulting in the "AND" result "00000010" 72. The processor circuit 42 of the network device "C" 12 in operation 60 can determine that the control bit for the adjacent deterministic segment 24g at bit position "7" in the "AND" result "00000010" 72 is set to "1", and in response can generate in operation 62 the bit index "B6" "00000010" 18. Hence, the network device "E" 12 stores the modified bit index "B6" 18 in its memory circuit 44 (indicating bit index "B6" is to be transmitted on the selected deterministic segment 26g), and queues in operation 64 the data packet 30 (containing the bit index "B6" 18) for transmission on the selected deterministic segment 26g to the egress network device "E" 12. As described previously with respect to the preceding network devices, the processor circuit 42 of the network device "C" stores in its memory circuit 44: a data structure identifying transmission was halted on its adjacent deterministic segment 24f in response to the bit index "B4"; a data structure identifying transmission was halted on its adjacent deterministic segment 24d in response to the bit index "B5"; and a data structure identifying transmission of the bit index "B6" on its adjacent deterministic segment 26g. Similar data structures can be stored by each network device in FIG. 1B for its corresponding set of adjacent deterministic segments.

In response to the device interface circuit 40 of the egress device "E" 12 receiving the data packet 30 (containing the bit index "B6" 18) via the deterministic segment 24g, the processor circuit 42 can identify in operation 78 that it is the destination network device for the deterministic path 22, and in response can send in operation 80 the data packet header 16 containing the received bit index "B6" 18 (or at least the received bit index "B6" 18) to the PCE 14 via a wired or wireless data link 28. Hence, the bit index "B6" 18, having its bits cleared by the network devices "I", "A", "B", "D", and "C" having previously replicated the data packet 30, enables the PCE 14 to identify the traversal path 22 as the replicated data packet 30 traverses throughout the deterministic data network 10.

Referring to FIG. 4B, the device interface circuit 40 of the PCE 14 in operation 82 can receive the bit header 16 containing the bit index "B6" 18 (or at least the received bit index "B6" 18) from the egress device "E" 18. The processor circuit 42 of the PCE 14 in operation 84 can determine whether the modified bit index "B6" 18 includes one or more set bits (i.e., one or more bits set to "1"), or whether the bit index "B6" 18 includes all reset bits (i.e., all bits reset to "0").

If in operation 86 the processor circuit 42 of the PCE 14 determines that all of the bits are reset in the bit index "B6" 18, then the processor circuit 42 of the PCE 14 can determine that all the corresponding segment endpoints 12 successfully transmitted the data packet 30 in response to the initial bit index "B0" set by the PCE.

If in operation 88 the processor circuit 42 of the PCE 14 identifies one or more set bits in the received bit index 18, the processor circuit 42 of the PCE 14 can identify one or more failing endpoints that failed to transmit the data packet based on identifying the segment endpoints associated with the selected deterministic segment 26 having the set bit in the bit index 18. Table 1 below illustrates example adjacency failures from the topology of FIG. 1A and the resulting bitstring 18:

TABLE 1

Adjacency Failures Identified by Bitstring

| Failing Adjacency | BIER Bitstring |
| --- | --- |
| I->A | (Frame Lost) |
| I->B | (Not Attempted) |
| A->C | 00010000 |
| A->B | 01001100 |
| B->D | 01001100 |
| D->C | 01001100 |
| C->E | (Frame Lost) |
| D->E | (Not Attempted) |

Hence, the processor circuit 42 of the PCE 14 can use the received bit index 18 to identify failures in the deterministic data network 10 and take corrective action, as needed. For example, the processor circuit 42 of the PCE 14 in operation 90 can compute an alternate path that bypasses the identified failures that were identified by the set bits; the processor circuit 42 of the PCE in operation 90 can compute the alternate paths using the bit addressable segments allocated in the bit index 18. If the processor circuit 42 of the PCE 14 finds an alternate path that bypasses the identified failures, the processor circuit 42 of the PCE in operation 92 can send the alternate bit index (identifying the alternate path) to the ingress network device (e.g., network device "I") 12 for implementation of the alternate path.

As illustrated in Table 1, instances may arise where a data packet 30 is lost, for example if the egress network device "E" 12 detects that it has failed to receive an expected deterministic packet or a prescribed number thereof (e.g., the egress network device "E" 12 fails to receive four consecutive deterministic data packets indicating a network failure). In response to the egress network device "E" 12 sending to the PCE 14 an indication of the failure to receive the deterministic data packet(s), the processor circuit 42 of the PCE can temporarily set all bits in the bit index 18 to "1" to maximize the delivery ratio and to more precisely identify the problem causing the lost packet, based on the network devices 12 outputting the data packet 30 on all the deterministic segments 26.

The PCE 14 can collect a number of bit indexes 18 from the egress network device "E" 12 over time to determine which of the network devices 12 (and/or deterministic segments 26) failed to respond to the set bits in the bit index (where all bits were initially set to "1"), and the PCE 14 in response can generate statistics, based on the collected bit indexes 18, to identify an alternate path as described previously with respect to operations 84, 88, 90, and 90. Hence, the PCE 14 can temporarily set all bits in the bit index 18 to "1" to identify the problem causing the lost packet, then set the bits associated with an alternate path upon identification of the problem. The PCE also can periodically set the bits associated with the identified problem (e.g., the broken segment(s) 26) in the alternate path bits to determine whether the problem has been solved and whether the prior path has been restored.

Hence, the PCE 14 can modify the bit index 14 for temporary troubleshooting, alternate path selection, and return to an initial path with minimal power consumption among the network devices 12.

FIG. 1B illustrates another network topology 10' where the deterministic path 22 can be implemented as a sequence of successively cascaded routing arcs (e.g., in a "ladder structure"). U.S. Pat. No. 9,226,292, issued Dec. 29, 2015, describes an Available Routing Construct (ARC) topology used to forward data packets via multiple (non-congruent) paths (e.g., parallel paths). As described previously with respect to FIGS. 1A, 4A, 4B, 5A, and 5B, a bit in a bit index 18 (the packet header 16) is set for each of the main and parallel paths.

FIG. 1B illustrates the following routing arcs for reaching the destination network device "Z" 12: ARC1 (i.e., root arc) comprising network devices F-H-I; ARC2 comprising network devices F-E2-M-G-H; ARC3 comprising network devices M-B-E2; ARC4 comprising network devices M-C2-A2-B2; and ARC5 comprising network devices C2-D2-P-G. Other network topologies can be used; for example, arcs can be defined such that an exit node cannot be a member of its successor node, such that ARC1 comprises F-H-I, ARC2 comprises E2-M-G (but not F and H which already belong to ARC1), ARC3 is a collapsed arc that includes only B2 (because E2 and M already belong to ARC2), ARC4 comprises A2-C2 (but not M which belongs to ARC2), and ARC5 comprises D2 and P (but not C2 which belongs to ARC4 or G which belongs to ARC2). Each routing arc can include one or more deterministic segments 24.

The routing arcs for reaching the destination network device "Z" 12 can be established by the PCE 14. As described previously, the PCE 14 also can establish selected deterministic segments 26 within the deterministic data network 10, each deterministic segment having two (peer) endpoints 12 for transmitting and receiving deterministic traffic, for example according to a prescribed schedule; in other words, each deterministic segment can be allocated by the PCE 14 a scheduled slot from a deterministic schedule. Each deterministic segment can traverse one or more hops, described below. The PCE 14 can build a deterministic path with the general shape of a ladder that the deterministic packets "climb". A copy of each packet flows on each side, and the steps are used for replication and elimination in case a side loses its copy of a packet. The segments are between steps along the vertical bars and the steps themselves.

The PCE associates a bit 20 from the bit index 18 with each deterministic segment 24, and a same bit serves for the ladder steps in both directions. As described previously, each bit 20 in the bit index 18 is associated with a corresponding one of the deterministic segments; each bit if set causes a corresponding endpoint of the deterministic segment to execute replication of the data packet for transmission of the replicated data packet into the corresponding deterministic segment; hence, each bit index generated by the path computation element identifies the deterministic segments to be used to transmit a data packet from a source network device to a destination network device.

As illustrated in FIG. 5C, the PCE 12 can generate in operation 52 of FIG. 4A a deterministic path 22 comprising the following selected deterministic segments 26 (identified herein by their endpoints) having a corresponding bit position 20 in the bit index "B7" 18 of FIG. 5: deterministic segment D2-G 26*i* is associated with bit 1 of the bit index "B7"; deterministic segment D2-C2 26*j* is associated with bit 2 of the bit index "B7" 18; deterministic segment C2-M 26*k* is associated with bit 3 of the bit index "B7" 18; deterministic segment M-F 26*l* is associated with bit 4 of the bit index "B7" 18; deterministic segment G-H 26*m* is associated with bit 5 of the bit index "B7" 18; deterministic segment F-Z 26*n* is associated with bit 6 of the bit index "B7" 18; deterministic segment H-I 26*o* is associated with bit 7 of the bit index "B7" 18; deterministic segment H-F 26*p* is associated with bit 8 of the bit index "B7" 18; and deterministic segment I-Z 26*q* is associated with bit 9 of the bit index "B7" 18. (It should be noted that the remaining bits in the bit index "B7" 18 are reset to zero and omitted for clarity; hence, the remaining deterministic segments in the topology of FIG. 1B (e.g., C2-A2-B2, G-M, etc.) are unused based on their respective bits in the bit index "B7" 18 being reset to zero).

As illustrated in FIG. 1B, a deterministic segment can include one or more hops: for example, the deterministic segment "D2-G" includes the link layer hops "D2-P-G". The replicator and eliminator points can be segment routing end points, and the replicators can be configured, for each flow, with 1) the set of source route segments, one for each replication that they make, 2) for each segment, a bit in a bitmap uniquely associated to that segment and 3) for each packet a schedule associated to each segment so the segment endpoints know when to expect a packet and when to send the various copies. The schedule replays over and over. In an example embodiment, segment routing can be used in a DetNet ladder.

Hence, in response to the device interface circuit 40 of the replicator device "D2" 12 receiving the bit index "B7", the replicator device "D2" 12 can add the source route header corresponding to the deterministic segment (e.g., "D2-P-G") (up or along a step) at the time of the replication, and an eliminator (e.g., "G") can removes that source route header.

Hence, is described previously with respect to FIG. 1A, the PCE 12 in FIG. 1B can send, to the source network device "0" 12, the corresponding bit index "B7" for insertion into a data packet 30 for transmission of the data packet from the source network device "0" 12 to the destination network device "Z" 12. As noted previously, a replication point will only send a packet along a programmed segment if the bit for that selected deterministic segment 26 is set in the packet 30, and it will reset (i.e., clear) that bit to zero at the time of sending.

As illustrated in FIGS. 1B and 5C, the network device "D2" 12 can receive in operation 54 a data packet 30 comprising a packet header 16 having a bit index "B7" 18. The processor circuit 42 of the network device "D2" can identify in operations 56 and 60, from the bit index "B7" 18, a first bit "1" set for a corresponding selected deterministic segment D2-G 26*i* and a second bit "2" set for a corresponding selected deterministic segment D2-C2 26*j*: the PCE 14 can configure the network device "D2" to recognize that it is an endpoint for transmitting deterministic traffic into each of the selected deterministic segment D2-G 26*i* and the selected deterministic segment D2-C2 26*j*. Hence, the processor circuit 42 of the network device "D2" 12 is configured for selectively executing a replication operation in operation 64 of the data packet 30 for transmission of a replicated data packet 30 into each of the selected deterministic segments 26*i* and 26*j*.

Prior to transmission the processor circuit 42 of the network device "D2" is configured for clearing each of the first "1" and "2" from the bit index "B7" prior to transmission to generate bit index "B8" and "B12" 18, respectively; hence, the processor circuit 42 of the network device "B2" queues for transmission in operation 64 the transmission of the data packet 30 (comprising the bit index "B8") onto the selected deterministic segment 26*i*, and the transmission of the data packet 30 (comprising the bit index "B12") onto the selected deterministic segment 26*j*. The updated bit index "B8" 18 ensures the peer network device "G" does not transmit the replicated data packet 30 back into the selected deterministic segment 26*i*, and the updated bit index "B12" 18 ensures the peer network device "C2" does not transmit the replicated data packet 30 back into the selected deterministic segment 26*j*. The data packet 30 transmitted on the selected deterministic segment 26*i* also can include a source-route header for the source-route path "D2-P-G" (in other words, from "D2" to "G" via next-hop "P").

As described previously, the network device "D2" 12 in operation 62 also can store the bit index "B8" 18 in the memory circuit 44 indicating that the bit index "B8" 18 was output on the selected deterministic segment 26*i*; the network device "D2" 12 also can store the bit index "B12" 18 indicating that the bit index "B12" 18 was output on the selected deterministic segment 26*j*. Since a segment endpoint can receive multiple copies of a same packet, the segment endpoint that serves as an eliminator in the replication/elimination process (i.e., the egress endpoint of the segment) maintains a bitmap that is the AND operation of the received bitmaps. That way, the bitmap in the node has the bits reset for all the successful transmissions. At the time of sending along the step of the ladder (to provide a copy to the other side), the bit may have been already reset by already receiving the copy from the other side, in which case the transmission is not needed and does not occur (since the bit is now reset to zero).

As described below with respect to the network device "F" 12, if a network device (serving as an egress endpoint of a segment) receives a second copy of the data packet (e.g., following the replication operation), the network device can determine whether to replicate the second copy of the data packet based on executing an AND operation between the bit index stored in the memory circuit 44 and the corresponding bit index in the second copy of the data packet.

In response to the network device "G" 12 receiving in operation 54 the data packet 30 (including the bit index "B8" 18) from its peer endpoint "D2" 12 in the selected deterministic segment 26*i* (via the network device "P" 12), the network device "G" 12 can respond to setting of bit 5 in the bit index "B8" in operation 60 by replicating the data packet 30 for transmission on the selected deterministic segment 26*m* to the network device "G" 12 after creating the bit index "B9" 12 by clearing the bit 5 from the bit index "B8" 18 in operation 62; hence, the network device "G" 12 queues for transmission in operation 64 the data packet 30 (comprising the modified bit index "B9" 18) into the selected deterministic segment 26*m* (at the appropriate scheduled time). As described previously, the processor circuit 42 of the network device "G" 12 in operation 62 stores in the memory circuit 44 a data structure specifying the bit index "B9" was transmitted on the selected deterministic segment 26*m*. The network device "G" 12 in operation 68 also halts any transmission of the data packet 30 back into the selected deterministic segment 26*i* because the corresponding bit "1" in the bit index "B8" 18 has been reset to zero by the network device "D2" 12. As described previously, all other bits from the bit index "B7" 18 are assumed to be zero to simplify discussion, hence in this example the network device "G" 12 in operation 68 will halt transmission of the data packet 30 to the network device "M" 12 via the deterministic segment "G-M" (the bit index "B8" 18 also can be stored in the memory circuit 44 for the deterministic segment G-D2 and G-M).

In response to the device interface circuit 40 of the network device "H" 12 receiving in operation 54 the data packet 30 comprising the bit index "B9" 18, the processor circuit 42 of the network device "H" 12 can respond in operation 60 to bits 7 and 8 in the bit index "B9" 18 for the selected deterministic segments 26*o* and 26*p*, respectively.

The processor circuit 42 of the network device "H" 12 generates in operation 62 the bit index "B10" 18 by resetting bit 7 in the received bit index "B9" 18 to zero, storing the bit index "B10" 18 in the memory circuit 44 for the selected deterministic segment 26*o*, and queuing in operation 64 the data packet 30 (comprising the modified bit index "B10" 18) for transmission on the selected deterministic segment 26*o* to the network device "I" 12. As indicated previously, the network device "H" does not transmit back into the selected deterministic segment 26*m* (toward G) because bit 5 in the bit index "B9" 18 has been reset to zero by the network device "G".

The processor circuit 42 of the network device "H" 12 repeats for the selected deterministic segment 26*p* in operation 66 by generating in operation 62 the bit index "B15" 18 by resetting bit 8 in the received bit index "B9" 18 to zero, storing the bit index "B15" 18 in the memory circuit 44 for the selected deterministic segment 26*p*, and queuing in operation 64 the data packet 30 (comprising the modified bit index "B15" 18) for transmission on the selected deterministic segment 26*p* to the network device "F" 12.

In response to the device interface circuit 40 of the network device "I" 12 receiving in operation 54 the data packet 30 comprising the bit index "B10" 18, the processor circuit 42 of the network device "I" 12 can respond in operation 60 to bit 9 in the bit index "B10" 18 for the selected deterministic segment 26*q* by generating in operation 62 the bit index "B11" 18 by resetting bit 9 in the received bit index "B10" 18 to zero, storing the bit index "B11" 18 in the memory circuit 44 for the selected deterministic segment 26*q*, and queuing in operation 64 the data packet 30 (comprising the modified bit index "B11" 18) for transmission on the selected deterministic segment 26*q* to the destination network device "Z" 12. As indicated previously, the network device "I" does not transmit back into the selected deterministic segment 26*o* (toward H) because bit 7 in the bit index "B10" 18 has been reset to zero by the network device "H" 12.

In response to the device interface circuit 40 of the network device "C2" 12 receiving in operation 54 the data packet 30 comprising the bit index "B12" 18, the processor circuit 42 of the network device "C2" 12 can respond in operation 60 to bit 3 in the bit index "B12" 18 for the selected deterministic segment 26*k* by generating in operation 62 the bit index "B13" 18 by resetting bit 3 in the received bit index "B12" 18 to zero, storing the bit index "B13" 18 in the memory circuit 44 for the selected deterministic segment 26*k*, and queuing in operation 64 the data packet 30 (comprising the modified bit index "B13" 18) for transmission on the selected deterministic segment 26*k* to the network device "M" 12. As indicated previously, the network device "C2" does not transmit back into the selected deterministic segment 26*j* (toward D2) because bit 2 in the bit index "B12" 18 has been reset to zero by the network device "D2" 12. The network device "C2" in operation 68 also halts any transmission to the network device "A2" in response to detecting the corresponding bit (not shown) in the received bit index "B12" is reset to zero.

In response to the device interface circuit 40 of the network device "M" 12 receiving in operation 54 the data packet 30 comprising the bit index "B13" 18, the processor circuit 42 of the network device "M" 12 can respond in operation 60 to bit 4 in the bit index "B13" 18 for the selected deterministic segment 26*l* by generating in operation 62 the bit index "B14" 18 by resetting bit 4 in the received bit index "B13" 18 to zero, storing the bit index "B14" 18 in the memory circuit 44 for the selected deterministic segment 26*l*, and queuing in operation 64 the data packet 30 (comprising the modified bit index "B14" 18) for transmission on the selected deterministic segment 26*l* to the network device "F" 12. As indicated previously, the network device "M" does not transmit back into the selected deterministic segment 26*k* (toward C2) because bit 3 in the bit index "B13" 18 has been reset to zero by the network device "C2" 12, and halts any transmission to the network device "B2" in response to detecting the corresponding bit (not shown) in the received bit index "B13" is reset to zero.

As described previously, the PCE 14 can configure the network device "F" 12 (e.g., by sending instructions) to identify that the network device "F" 12 can receive one or more copies of a data packet 30 from different deterministic segments, for example the selected deterministic segments 26*l* and/or 26*p*. Hence, the device interface circuit 40 and/or the processor circuit 42 of the network device "F" 12 can be configured to wait for all intended copies of the data packet 30 according to the deterministic schedule established by the PCE 14 (e.g., from network devices "H" and "M") before initiating packet processing.

Hence, the processor circuit 42 of the network device "F" 12 in operation 58 can detect that it has waited to receive two copies of the data packet 30 via the respective selected deterministic segments 26*l* and 26*p*. In response to receiving the two copies of the data packet 30 via the respective deterministic segments 26*l* and 26*p* (carrying the respective bit indexes "B14" and "B15" 18), the processor circuit 42 of the network device "F" 12 in operation 70 of FIG. 4A and FIG. 5D can perform a bitwise AND operation on the bit index "B14" 18 (received from the selected deterministic segment 26*l*) and the bit index "B15" 18 (received from the selected deterministic segment 26*p*), resulting in the "AND" result "000001101" 72'. The processor circuit 42 of the network device "F" 12 in operation 60 can determine that the control bit for the adjacent selected deterministic segment 26*n* at bit position "6" in the "AND" result "000001101" 72' is set to "1", and in response can generate in operation 62 the bit index "B16" "000000101" 18. Hence, the network device "F" 12 stores the modified bit index "B16" 18 in its memory circuit 44 (indicating bit index "B16" is to be transmitted on the selected deterministic segment 26*n*), and queues in operation 64 the data packet 30 (containing the bit index "B16" 18) for transmission on the selected deterministic segment 26*n* to the destination network device "Z" 12.

As described previously, the PCE 14 can configure the destination network device "Z" 12 to recognize that it is the destination network node and is to receive copies of the data packet 30 from the selected deterministic segment 26*n* and the selected deterministic segment 26*q*. In response to the device interface circuit 40 of the egress/destination network device "Z" 12 waiting to receive the data packet 30 (containing the bit index "B11" 18) via the selected deterministic segment 26*q*, and in operation 58 a copy of the data packet 30 (containing the bit index "B16") from the selected deterministic segment 26*n*, the processor circuit 42 of the destination network device "Z" 12 can execute in operation 70 a bitwise AND operation on the bit index "B11" 18 (received from the selected deterministic segment 26*q*) and the bit index "B16" 18 (received from the selected deterministic segment 26*n*), resulting in the "AND" result "000000000" 72". Hence, the network device "Z" 12 can store the modified AND result 72" in its memory circuit 44, and send in operation 80 the modified AND result 72" to the PCE 14.

As apparent from the foregoing description, each bit index "B7" through "B16" illustrates an updated bit index generated by a replicator device; hence, each bit index "B7" through "B16" represents a corresponding "signature" of a traversal path as a replicated data packet traverses throughout the deterministic data network 10. Hence, according to an example embodiment, the bits on and off in the BIER bitmap generate a signature of the traversal path that enables the PCE 14 discriminate which replicator generated the particular copy of a data packet by identifying the reset bits at the furthest segments along the path to the destination. This signature is particularly beneficial functionality for DetNet, since the signature enables the PCE 14 to identify which copy by which replication point a packet is, and at the point of arrival; hence, the PCE can determine which segment failed on a per packet basis, and use that to de/reactivate replication points (by setting the bits).

The statistics of the bits of the bit index 18 as received by the deterministic receiver "Z" 12 at the end of the path (including the AND result 72") can be sent to the PCE 14, enabling the PCE 14 to determine in operations 82, 84, and 88 if some links experience transient or long term failures; hence, the PCE 14 can activate or deactivate some replication points based on those statistics, as described above. As illustrated previously, if in operation 84 the processor circuit 42 of the PCE 14 determines all the bits in the AND result 72" equal zero, then the PCE 14 is able to identify that all corresponding endpoints successfully transmitted the data packet 30 on the respective selected deterministic segments 26 as specified in the initial bit index "B7".

According to example embodiments, a BIER bitmap can control the activity of the replication points in a deterministic network such as DetNet. The bits are set based on the PCE decision to activate and deactivate replication points. The example embodiments can be applied to either IP segments (segment routing) or Ethernet links. Further, the BIER bitmaps are inserted in-band with the deterministic packet, enabling the tracking of all the packets without the need for additional transmissions for OAM. Further, each bit in a bit index can serve three functions: (1) a specific bit is set at the source as directed by the PCE to control whether a segment will be used for replication, and (2) the specific bit is reset at the segment source to indicate that the replication was executed; (3) if the specific reset bit is propagated to the destination network device "Z", the PCE 14 can determine (based on comparing with the original bit index 18*a* assigned by the PCE 14) that the deterministic segment associated with the specific reset bit is active and reachable in the deterministic network 10; if, however the PCE 14 determines the specific bit is set (e.g., is not reset due to the data packet carrying the specific reset bit was dropped due to link failure), the PCE 14 can detect the link failure in the deterministic segment associated with the specific bit that should have been detected as reset.

Hence, BIER bitmap can be used at any point of time for debug, to determine the replication point that made the last replication and what copy that is, since each copy ends up with a unique signature. Further, the PCE can decide whether some replication points need to be activated. The destination device can provide its statistics of the bits to the PCE; the PCE can determine from the updated bit index received by the destination device whether there are misbehaving links, and the PCE can activate some replication points that are part of in the deterministic path but currently inactive.

As apparent from the foregoing, a bit in a bit index can be set by a transmitting network device; alternately, in deterministic segments overlying multiple hops (i.e. via multiple link layer hops), the penultimate node in the multiple hop sequence can reset the bit prior to forwarding the data packet 30 to the segment endpoint; alternately, a transmitting network device can reset the bit in the bit index 18 after receiving a layer 2 acknowledgement of transmission (e.g., receiving an acknowledgement of reception of the data packet 30 within the same TSCH or 6TiSCH timeslot as transmission thereof), where a receiving network device could reset the bit in the bit index 18 as part of the acknowledgement process within the timeslot.

Although the example embodiments describe multi-hop deterministic segments, a multi-hop deterministic segment can be implemented with one or more non-deterministic network devices between the deterministic segment endpoints, where the one or more non-deterministic network devices are not configured for deterministic network protocols; in such cases, timing information can be added into a data packet by a deterministic network device before forwarding to a non-deterministic network device, enabling the egress deterministic segment endpoint to adjust for jitter and reconstruct the required deterministic timing based on the timing information in the received data packet.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
receiving, by a network device in a deterministic data network comprising deterministic segments having peer endpoint devices, a data packet comprising a packet header having a bit index generated by a controller, each bit in the bit index associated with a corresponding one of the deterministic segments;
the network device identifying, from the bit index, a first bit for a corresponding first deterministic segment and a second bit for a corresponding second deterministic segment, wherein the network device is a peer endpoint device for transmitting deterministic traffic into each of the first and second deterministic segments toward a corresponding peer endpoint device;
the network device selectively executing a replication operation of the data packet for transmission of a replicated data packet into each of the first and second deterministic segments, based on the network device detecting the corresponding first and second bits set for replication.

2. The method of claim 1, wherein the selectively executing comprises clearing each of the first and second bits from each replicated data packet prior to transmission into each of the first and second deterministic segments, ensuring a peer endpoint device in any one of the first or second deterministic segments does not transmit the replicated data packet back into any one of the first or second deterministic segments.

3. The method of claim 2, wherein the bit index, having bits cleared by network devices having previously replicated the data packet, enables a path computation element as said controller to identify a traversal path as the replicated data packet traverses throughout the deterministic data network.

4. The method of claim 2, further comprising: the network device storing, in a memory circuit, the bit index including the first bit cleared as a first modified bit index for the first deterministic segment;

the network device storing, in the memory circuit, the bit index including the second bit cleared as a second modified bit index for the second deterministic segment.

5. The method of claim 1, further comprising: the network device receiving a second copy of the data packet, the second copy of the data packet having the corresponding first and second bits set for replication;
the network device determining whether to replicate the second copy of the data packet based on executing an AND operation between the corresponding bit index in the data packet and the corresponding bit index in the second copy of the data packet.

6. The method of claim 1, further comprising the network device halting any transmission of the data packet into the second deterministic segment, based on the network device detecting the second bit is cleared and not set for replication.

7. An apparatus comprising: a device interface circuit configured for receiving a data packet comprising a packet header having a bit index generated by a controller, the apparatus implemented as a network device in a deterministic data network comprising deterministic segments having peer endpoint devices, each bit in the bit index associated with a corresponding one of the deterministic segments; and
a processor circuit configured for identifying, from the bit index, a first bit for a corresponding first deterministic segment and a second bit for a corresponding second deterministic segment, wherein the network device is a peer endpoint device for transmitting deterministic traffic into each of the first and second deterministic segments toward a corresponding peer endpoint device;
the processor circuit further configured for selectively executing a replication operation of the data packet for transmission of a replicated data packet into each of the first and second deterministic segments, based on the network device detecting the corresponding first and second bits set for replication.

8. The apparatus of claim 7, wherein the processor circuit is configured for clearing each of the first and second bits from each replicated data packet prior to transmission into each of the first and second deterministic segments, ensuring a peer endpoint device in any one of the first or second deterministic segments does not transmit the replicated data packet back into any one of the first or second deterministic segments.

9. The apparatus of claim 8, further comprising a memory circuit configured for storing the bit index including the first bit cleared as a first modified bit index for the first deterministic segment and the bit index including the second bit cleared as a second modified bit index for the second deterministic segment.

10. The apparatus of claim 7, wherein: the device interface circuit is configured for receiving a second copy of the data packet, the second copy of the data packet having the corresponding first and second bits set for replication;
the processor circuit configured for determining whether to replicate the second copy of the data packet based on executing an AND operation between the corresponding bit index in the data packet and the corresponding bit index in the second copy of the data packet.

11. The apparatus of claim 7, wherein the processor circuit is configured for halting any transmission of the data packet into the second deterministic segment, in response to the processor circuit detecting the second bit is cleared and not set for replication.

12. One or more non-transitory tangible media encoded with logic for execution by a machine and when executed by the machine causing:
receiving, by the machine implemented as a network device in a deterministic data network comprising deterministic segments having peer endpoint devices, a data packet comprising a packet header having a bit index generated by a controller, each bit in the bit index associated with a corresponding one of the deterministic segments;
the network device identifying, from the bit index, a first bit for a corresponding first deterministic segment and a second bit for a corresponding second deterministic segment, wherein the network device is a peer endpoint device for transmitting deterministic traffic into each of the first and second deterministic segments toward a corresponding peer endpoint device;
the network device selectively executing a replication operation of the data packet for transmission of a replicated data packet into each of the first and second deterministic segments, based on the network device detecting the corresponding first and second bits set for replication.

13. The one or more non-transitory tangible media of claim 12, wherein the selectively executing comprises clearing each of the first and second bits from each replicated data packet prior to transmission into each of the first and second deterministic segments, ensuring a peer endpoint device in any one of the first or second deterministic segments does not transmit the replicated data packet back into any one of the first or second deterministic segments.

14. The one or more non-transitory tangible media of claim 13, further causing:
storing, in a memory circuit, the bit index including the first bit cleared as a first modified bit index for the first deterministic segment;
storing, in the memory circuit, the bit index including the second bit cleared as a second modified index for the second deterministic segment.

15. The one or more non-transitory tangible media of claim 12, further causing: receiving a second copy of the data packet, the second copy of the data packet having the corresponding first and second bits set for replication; and
determining whether to replicate the second copy of the data packet based on executing an AND operation between the corresponding bit index in the data packet and the corresponding bit index in the second copy of the data packet.

16. The one or more non-transitory tangible media of claim 12, further causing halting any transmission of the data packet into the second deterministic segment, based on detecting the second bit is cleared and not set for replication.

17. A method comprising: generating, by a path computation element in a deterministic data network, a plurality of deterministic segments for routing data traffic to a destination network device, each deterministic segment having a pair of peer endpoint devices:
generating a bit index for insertion in each data packet transmitted in the deterministic data network, each bit in the bit index associated with a corresponding one of the deterministic segments, each bit that is set causing a corresponding peer endpoint device of the deterministic segment to execute replication of the data packet for transmission of the replicated data packet into the corresponding deterministic segment, each bit index generated by the path computation element identifying the deterministic segments to be used to transmit a data packet from a source network device to a destination network device; and sending, to the source network device, the corresponding bit index for insertion into a data packet for transmission of the data packet from the source network device to the destination network device.

18. The method of claim 17, further comprising: receiving from the destination device a modified bit index for a corresponding data packet having been transmitted via the deterministic data network according to the bit index generated by the path computation element;

determining whether the modified bit index includes one or more set bits, or whether the modified bit index consists of all reset bits;

selectively determining all corresponding peer endpoint devices that successfully transmitted the data packet in response to the corresponding bit being reset in the bit index; and selectively identifying a corresponding one or more failing peer endpoint devices that failed to transmit the data packet in response to determining the corresponding one or more set bits in the modified bit index.

19. One or more non-transitory tangible media encoded with logic for execution by a machine and when executed by the machine causing:

generating, by the machine implemented as a path computation element in a deterministic data network, a plurality of deterministic segments for routing data traffic to a destination network device, each deterministic segment having a pair of peer endpoint devices;

generating a bit index for insertion in each data packet transmitted in the deterministic data network, each bit in the bit index associated with a corresponding one of the deterministic segments, each bit that is set causing a corresponding peer endpoint device of the deterministic segment to execute replication of the data packet for transmission of the replicated data packet into the corresponding deterministic segment, each bit index generated by the path computation element identifying the deterministic segments to be used to transmit a data packet from a source network device to a destination network device; and sending, to the source network device, the corresponding bit index for insertion into a data packet for transmission of the data packet from the source network device to the destination network device.

20. The one or more non-transitory tangible media of claim 19, further causing: receiving from the destination device a modified bit index for a corresponding data packet having been transmitted via the deterministic data network according to the bit index generated by the path computation element;

determining whether the modified bit index includes one or more set bits, or whether the modified bit index consists of all reset bits;

selectively determining all corresponding peer endpoint devices that successfully transmitted the data packet in response to the corresponding bit being reset in the bit index; and selectively identifying a corresponding one or more failing peer endpoint devices that failed to transmit the data packet in response to determining the corresponding one or more set bits in the modified bit index.

* * * * *